United States Patent
Benitez

(10) Patent No.: US 12,156,507 B2
(45) Date of Patent: Dec. 3, 2024

(54) ROLLING PET TOY

(71) Applicant: Ryan Benitez, Roy, UT (US)

(72) Inventor: Ryan Benitez, Roy, UT (US)

( * ) Notice: Subject to any disclaimer, the term of this patent is extended or adjusted under 35 U.S.C. 154(b) by 230 days.

(21) Appl. No.: 17/856,906

(22) Filed: Jul. 1, 2022

(65) Prior Publication Data

US 2023/0012369 A1  Jan. 12, 2023

Related U.S. Application Data

(60) Provisional application No. 63/218,894, filed on Jul. 6, 2021.

(51) Int. Cl.
A01K 15/02 (2006.01)

(52) U.S. Cl.
CPC .................................. A01K 15/025 (2013.01)

(58) Field of Classification Search
CPC .......... A01K 15/025; A63H 1/00; A63H 1/20; A63H 33/18; A63B 43/002
USPC .................................. 446/236, 269, 431, 437
See application file for complete search history.

(56) References Cited

U.S. PATENT DOCUMENTS

| | | | | |
|---|---|---|---|---|
| D145,875 S | * | 11/1946 | Plebanek | 446/431 |
| 2,521,703 A | * | 9/1950 | Emmitt | A63B 41/00 D11/89 |
| 2,546,896 A | * | 3/1951 | Kassuba | A63B 41/08 89/36.01 |
| 2,783,046 A | * | 2/1957 | Lien | A63B 43/002 446/124 |
| 4,309,038 A | | 1/1982 | Spoon | |
| 4,772,241 A | * | 9/1988 | Bro | A63H 1/20 446/234 |
| 4,921,458 A | * | 5/1990 | Greenwood | A63H 11/10 446/101 |
| 5,014,990 A | * | 5/1991 | Kaser | A63H 33/18 473/588 |
| 5,028,053 A | * | 7/1991 | Leopold | A63B 43/008 473/473 |
| 5,338,027 A | * | 8/1994 | Rehkemper | A63B 65/00 473/588 |
| 5,536,195 A | * | 7/1996 | Stamos | A63H 33/18 446/46 |
| 5,895,308 A | * | 4/1999 | Spector | A63H 3/02 446/183 |
| 6,003,470 A | | 12/1999 | Budman | |
| D424,158 S | | 5/2000 | Besecke | |

(Continued)

FOREIGN PATENT DOCUMENTS

| | | | |
|---|---|---|---|
| DE | 202010011271 U1 * | 12/2010 | A63B 43/002 |
| JP | 2008-17841 | 1/2008 | |

OTHER PUBLICATIONS

Hero Pink Sammy the Snail Puppy Toy, Petco.com, 2021.

*Primary Examiner* — Magdalena Topolski
(74) *Attorney, Agent, or Firm* — PETERSON IP; Brett Peterson

(57) ABSTRACT

A pet toy is shaped like a stylized animal and is generally disc shaped. The pet toy has one or more appendages such as feet which protrude outside of a generally circular perimeter formed by the pet toy body and cause the pet toy to jump and move irregularly when the pet toy is rolled along the ground, simulating an animal which is running along the ground. The pet toy provides increased mental and physical stimulation to an animal chasing the toy.

17 Claims, 8 Drawing Sheets

(56) References Cited

U.S. PATENT DOCUMENTS

| | | | |
|---|---|---|---|
| 6,126,510 A * | 10/2000 | Weiss, Jr. | A63H 3/02 446/431 |
| 6,293,879 B2 * | 9/2001 | Moore | A63H 33/18 473/590 |
| 6,390,879 B1 * | 5/2002 | Spector | A63H 33/18 473/588 |
| D458,312 S | 6/2002 | Wood | |
| 6,470,830 B2 | 10/2002 | Mann | |
| 6,609,944 B1 * | 8/2003 | Viola | A63H 3/06 119/707 |
| 6,645,101 B1 * | 11/2003 | Wong | A63B 43/00 473/594 |
| 6,676,746 B2 * | 1/2004 | Langford | C04B 40/0039 106/661 |
| 6,902,464 B1 * | 6/2005 | Lee | A63H 29/22 446/438 |
| 6,945,195 B1 | 9/2005 | Morrison | |
| 7,014,523 B2 * | 3/2006 | Anderson | A63H 33/40 446/236 |
| 7,081,032 B1 * | 7/2006 | Holgate | A63H 33/18 446/46 |
| D536,140 S | 1/2007 | Renforth | |
| 7,413,524 B1 * | 8/2008 | Bibby | A63B 43/002 473/595 |
| D576,689 S * | 9/2008 | Ivanic | D21/443 |
| D583,424 S | 12/2008 | Bruneel | |
| 7,867,115 B2 * | 1/2011 | Zawitz | A63H 33/22 446/175 |
| 7,931,520 B2 * | 4/2011 | Bryce | A63H 17/262 446/431 |
| D637,668 S * | 5/2011 | Welch | D21/597 |
| D644,333 S | 8/2011 | Bredemeier | |
| 8,579,741 B2 * | 11/2013 | Heland | A63B 43/002 473/595 |
| 8,894,465 B2 * | 11/2014 | McClintock | A63H 33/005 446/431 |
| 10,603,525 B2 * | 3/2020 | Krueger | B26F 3/00 |
| D882,888 S * | 4/2020 | Steinkraus | D30/121 |
| D933,155 S | 10/2021 | Hsu | |
| 2004/0200433 A1 | 10/2004 | Oblack | |
| 2009/0255482 A1 | 10/2009 | Santarsiero | |
| 2014/0060451 A1 | 3/2014 | Oblack | |
| 2023/0059351 A1 | 2/2023 | Ottosson | |

\* cited by examiner

ROLLING PET TOY

PRIORITY

The present application claims the benefit of U.S. Provisional Application Ser. No. 63/218,894, filed Jul. 6, 2021, which is herein incorporated by reference in its entirety.

THE FIELD OF THE INVENTION

The present invention relates to pet toys. In particular, examples of the present invention relate to a pet toy which may be thrown or rolled for a pet to chase.

INTRODUCTION

Pets need exercise and activity for both physical and mental well-being. Dogs, for example, can become destructive if they do not have sufficient exercise and mental stimulation. The present pet toy makes the game of fetch more entertaining for both the pet and the person playing with the pet. This leads to increased activity and exercise for the pet and in turn leads to better behavior and increased longevity for the pet.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
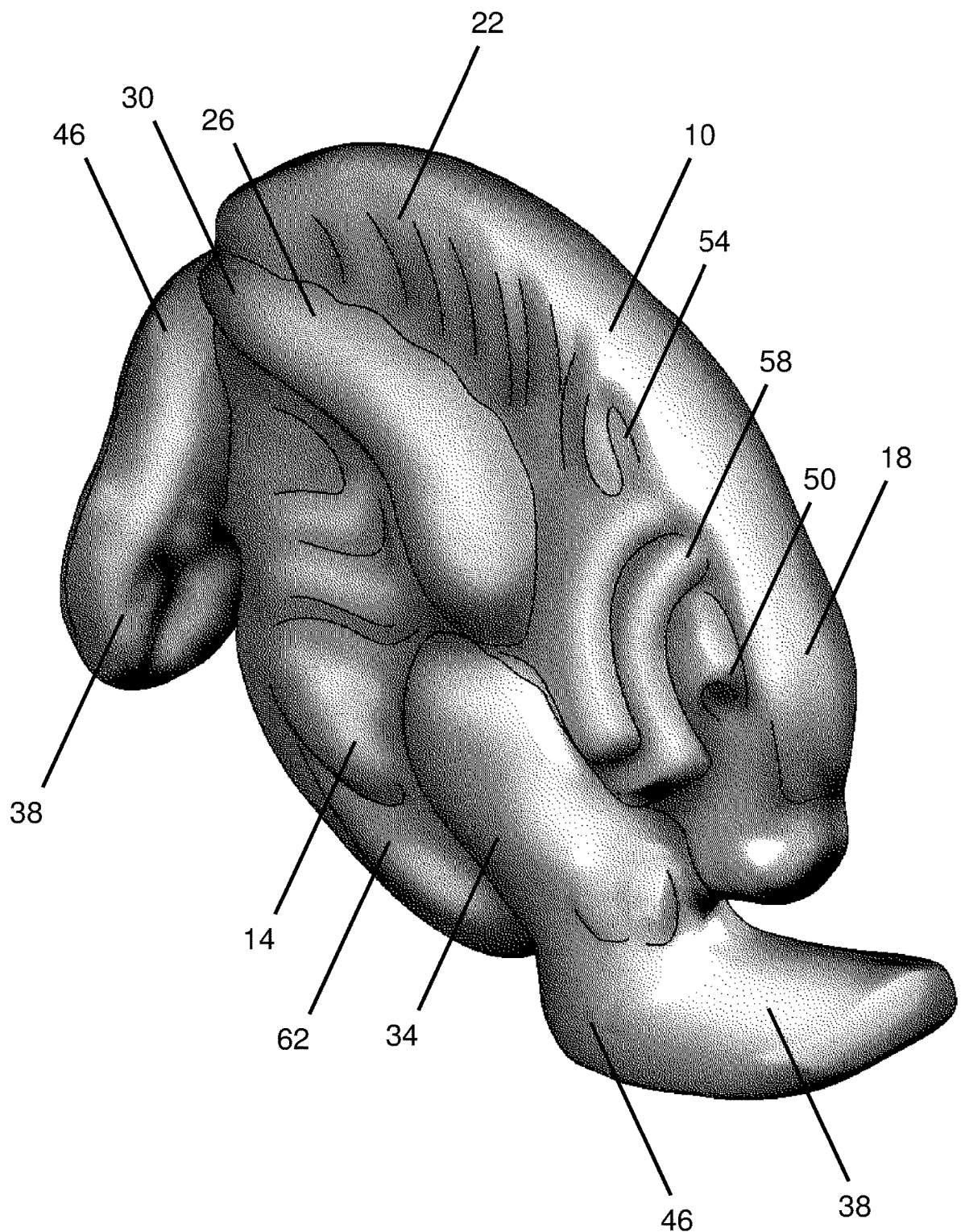
FIG. 1 is a drawing which shows a perspective view of a pet toy.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

As used herein, "adjacent" refers to near or close sufficient to achieve a desired effect. Although direct contact is common, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be such as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, terms such as "about" or "approximately" mean that the indicated value may be higher or lower by one significant figure. Thus, the term "about 5" should be interpreted to include the range of values between 4 and 6.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The invention provides a rolling pet toy which provides a random and unpredictable motion while it rolls. The pet toy is generally disc shaped and is stylized like an animal. As used herein, the terms "disc" or "disc shaped" should not be interpreted to require an exactly circular shape, but that the item is circular in shape with minor variations. Much of the animal is modified to provide a generally circular edge. The pet toy includes one or a few appendages which extend outwardly from the rest of the body of the toy and extend outwardly beyond the general disc shape. These appendages strike the ground irregularly when the pet toy is rolled along the ground and cause the pet toy to randomly bounce into the air or change direction. This random bouncing or change of direction causes the pet toy to move unpredictably in contrast to a ball or other toy which will roll across the ground in a generally straight line. The motion of the pet toy while rolling across the ground simulates a running animal and many pets are instinctively drawn to this type of motion. The unpredictable motion makes it more difficult for a pet such as a dog to chase and catch the pet toy. The pet toy increases both the physical difficulty and the mental challenge in chasing the catching the pet toy; keeping the pet engaged and providing greater exercise to the pet.

Figure 2:
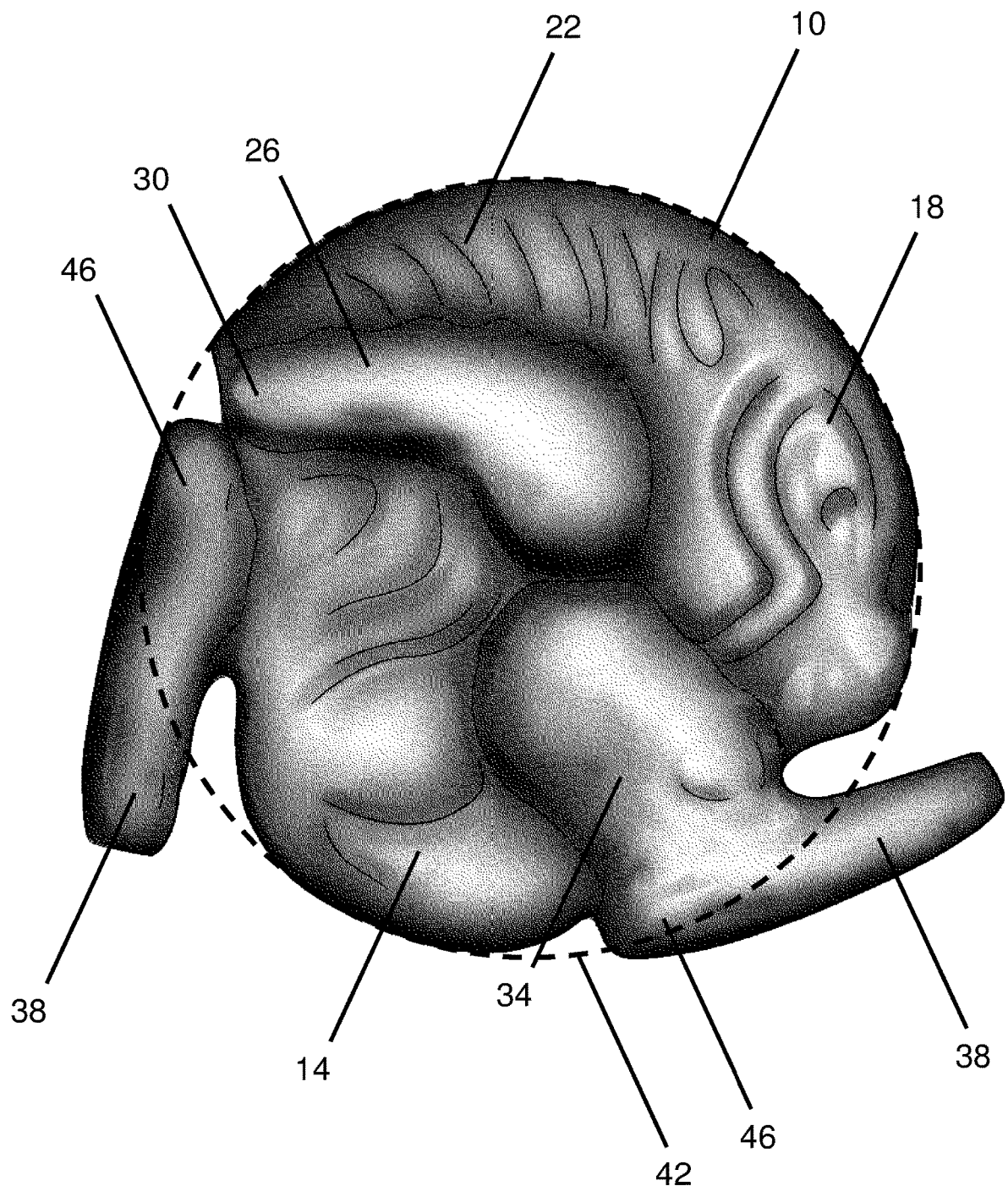
FIG. 2 is a drawing which shows a left view of the pet toy.

Turning now to FIGS. 1 and 2, an example pet toy 10 is shown. FIG. 1 shows a perspective view and FIG. 2 shows a side view of the pet toy 10. The pet toy 10 is generally disc shaped, and may commonly be between about 6 and about 8 inches in diameter (length and height) and between about 1 and about 2 inches in thickness. The pet toy 10 is irregular in shape. The pet toy 10 is shaped in the stylized form of an animal such as a squirrel. Accordingly, the pet toy 10 includes a body 14, head 18, and back 22. The pet toy 10 includes arms (front legs) 26 with hands/front paws 30 and rear legs 34 with feet/rear paws 38.

Features on the body 14, head 18, and back 22 are formed with grooves and ridges which create a textured surface. The head 18 includes eyes 50, ears 54, and cheeks 58. Features such as the arms 26, front paws 30, rear legs 34, and rear paws 38 are also formed with grooves and ridges and these features protrude laterally from the general disc shape to give surface texture to the pet toy 10. These surface features make the pet toy 10 more easily gripped and carried in the pet's mouth. The animal represented by the pet toy 10 is portrayed in a 3-dimensional form with appendages while preserving a generally flat overall disc shape. The protruding ends or bottom soles of the feet/paws 30 are enlarged laterally and may have a bulbous shape which is easily held by a person throwing the pet toy 10; resulting in increased control over the pet toy during use. The pet toy 10 may be easily used by persons with large or small hands and may be thrown from the left or right hand.

The pet toy 10 is shaped such that the outer edges of the body 14, head 18, belly 62, and back 22 are generally arranged into a circle and form a disc shaped outer circumference of the pet toy 10. This circular shape is indicated by the circle 42 superimposed on the left side view shown in FIG. 2. While the pet toy 10 is shown with an outer edge that closely follows a circle 42, the parts of the animal such as the back 22, belly 14, and head 10 may have more variation in shape and deviate more from an ideal circle 42 while still providing a generally circular shape which rolls along the ground well. The pet toy 10 includes appendages which protrude beyond the general disc shape 42 formed by the body 14 of the pet toy 10. In the example pet toy 10, limbs (e.g., the feet 38) extend outside of the circle 42. In the example pet toy 10, the bottoms of the rear heels 46 are positioned along the circle 42 while the two ends of the rear feet 38 extend beyond the circle 42. The ends of the rear feet 38 extend outside of the circle 42 by a distance which is between about one tenth and about one fourth of the diameter of the circle 42, and more particularly by about one fifth of the diameter of the circle 42. The appendages which protrude outside of the disc shaped body are animal body parts and are typically limbs (e.g., arms/hands or legs/feet), tails, or part of the head.

While a squirrel is shown as the example pet toy 10, other animals may be used. If the pet toy represents a bird, for example, the bird body, back, belly and head could form the disc shape. A limb (e.g., foot, wing), tail, beak, or head could protrude outside of the disc shape to cause the pet toy to bounce and move irregularly when rolled across the ground.

The pet toy 10 typically includes between 1 and 3 appendages which extend outside of the general disc shape 42 formed by the body of the pet toy 10. The pet toy 10 rolls more irregularly with 3 or fewer protruding appendages and often rolls best with one or two protruding appendages. These appendages are typically arms, legs, ears, mouth/nose, or the head of the animal embodied by the pet toy. The appendages are typically located at non-uniform locations around the pet toy 10 where they are not spaced at equal angular positions. Thus, the pet toy 10 is not rotationally symmetric. Similarly, the varied shape of the pet body 14 and the non-rotationally symmetrical positioning of the protruding appendages results in the center of mass of the pet toy 10 not being located at the center of the circular shape defined by the pet toy body (i.e. the center of circle 42). Having the center of mass of the pet toy 10 not located at the center of the circular perimeter shape of the body 14 helps the pet toy roll and jump in an irregular fashion. In the example pet toy 10, two protruding appendages, the rear feet 38, are positioned approximately 120 degrees from each other rather than being spaced 180 degrees apart from each other. Having greater than 3 appendages tends to cause the pet toy 10 to roll across the ends of the appendages rather than bounce when an appendage strikes the ground, and the pet toy 10 often works better with one or two appendages which extend outside of the general disc shape 42. One protruding appendage may be heavier than the other protruding appendage or extend farther from the body 14/circle 42 than the other protruding appendage as this arrangement may enhance the irregular rolling and jumping movement of the pet toy 10.

The front legs/arms 26, rear legs 34, and rear feet 38 are approximately 1.5 inches wide and are near the maximum width of the pet toy 10. The edges of the body 14, head 18, and back 22 near circle 42 are thinner; often about 0.8 inches or about half of the maximum thickness of the pet toy 10. This thinner circumference can allow pets to more easily grasp the pet toy 10 with their mouth. The wider rear feet 38 may also provide a location which is easy for pets to grasp the pet toy 10 with their mouths.

The perspective view of FIG. 1 more clearly shows the variation in thickness of the pet toy 10 and shows the various grooves and ridges which form the surface of the pet toy 10. The 3-dimensional front legs 26, front paws 30, rear legs 34, and rear feet 38 as well as the various grooves and ridges used to create the body 14, head 18, and back 22 provide stimulation to a pet and are more interesting than a smooth object which is devoid of these surface features. The pet toy 10 may also be colored to resemble the animal which is represented by the pet toy 10. FIG. 1 also shows how the rear feet 38 are broad; being about as wide as the overall pet toy 10. This strengthens the rear feet 38 and helps them to provide a desired erratic behavior when rolling the pet toy 10.

Figure 3:
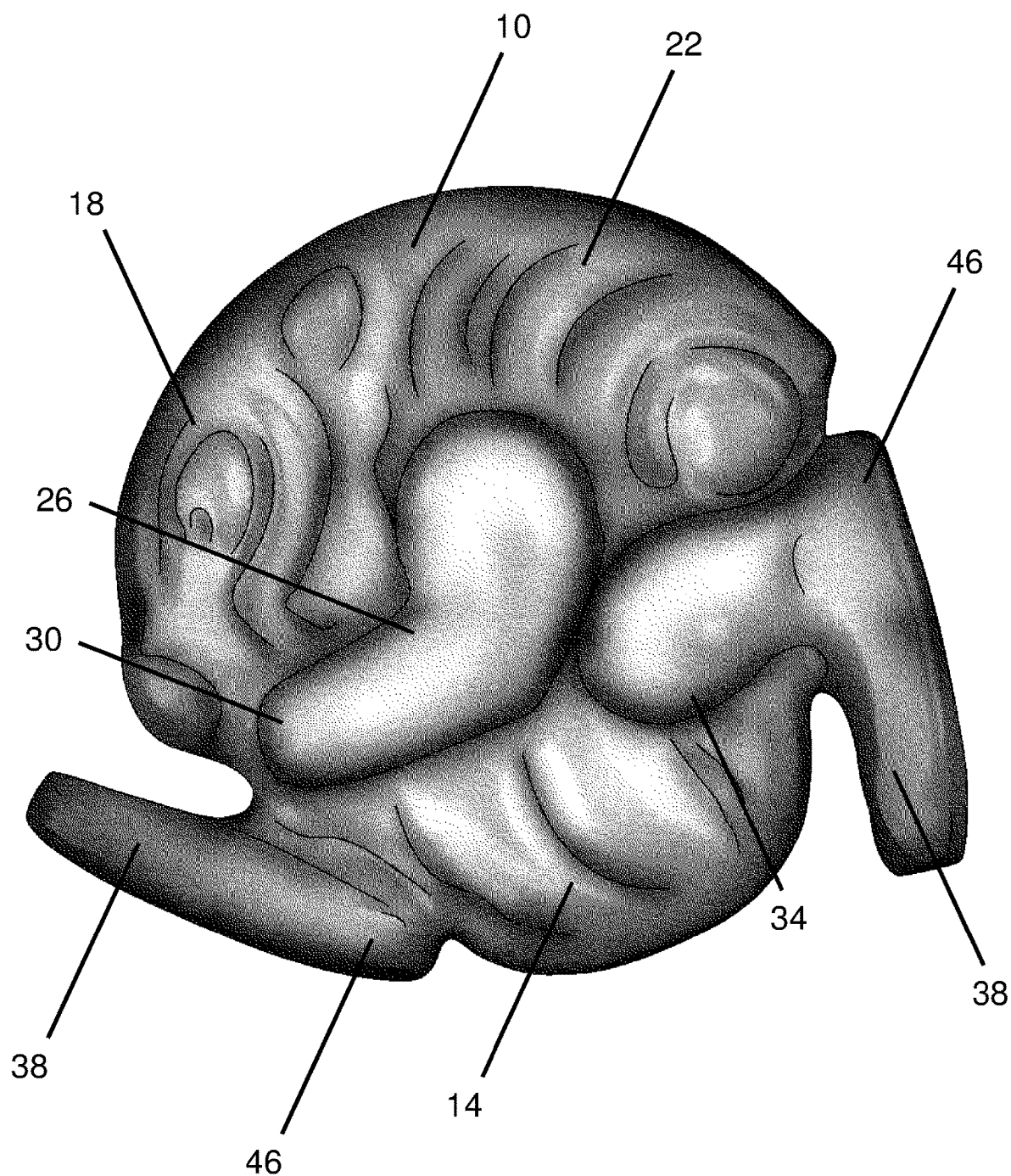
FIG. 3 is a drawing which shows a right view of the pet toy.

In the example pet toy 10, the left front leg 26 extends backwards and the left rear leg 34 extends frontwards as is shown in FIG. 2. The right front leg 26 extends frontwards and the right rear leg 34 extends backwards as is shown in FIG. 3. The two rear feet 38 are positioned approximately 120 degrees apart from each other relative to the center of the pet toy 10. This creates an outer perimeter with a longer generally circular edge around the head 18 and back 22 and a shorter generally circular edge around the lower body 14 (the belly 62).

Figure 4:
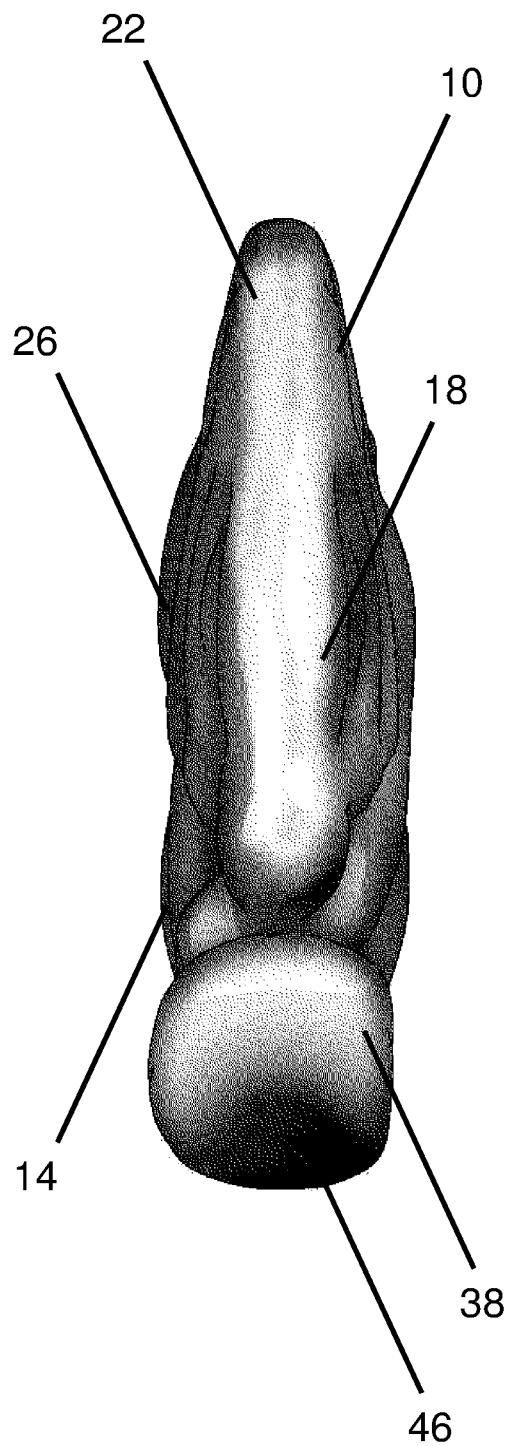
FIG. 4 is a drawing which shows a front view of the pet toy.
Figure 5:
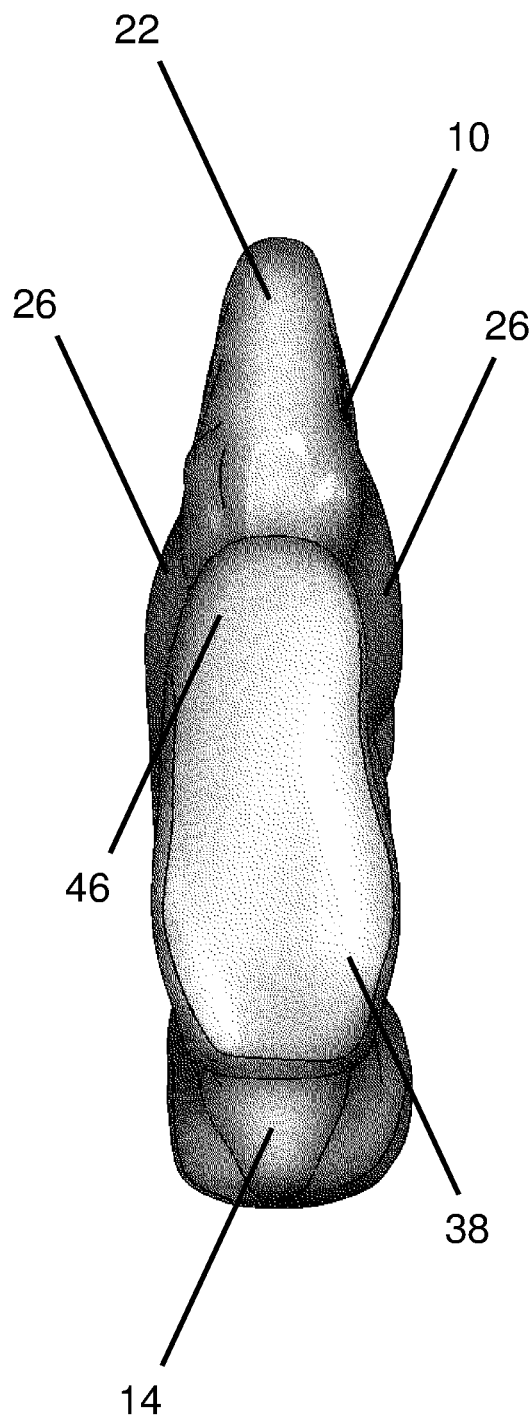
FIG. 5 is a drawing which shows a back view of the pet toy.
Figure 6:
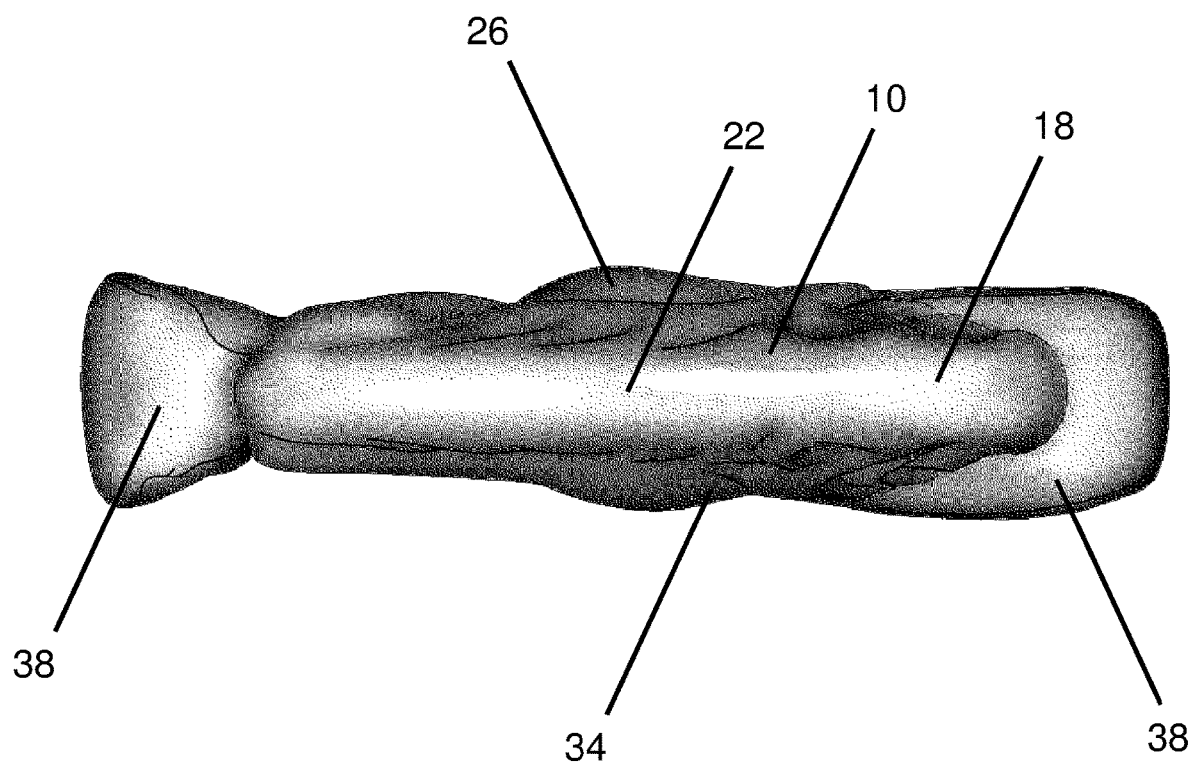
FIG. 6 is a drawing which shows a top view of the pet toy.
Figure 7:
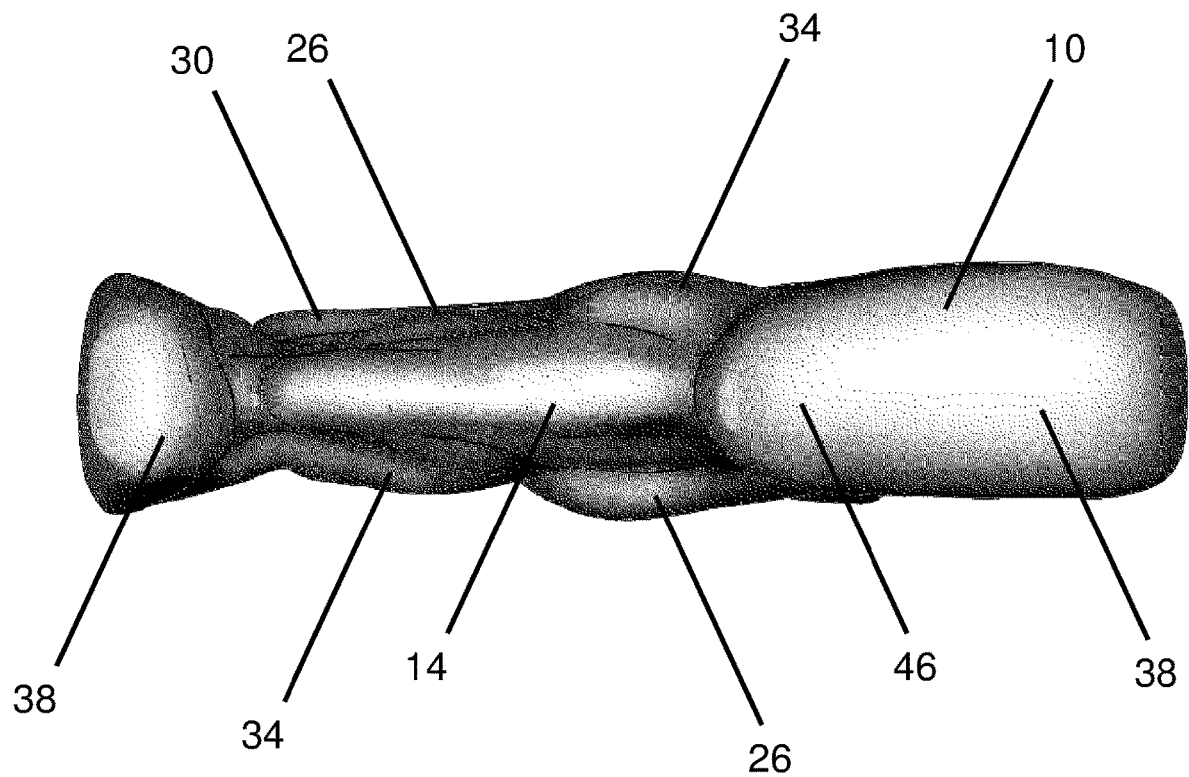
FIG. 7 is a drawing which shows a bottom view of the pet toy.

FIG. 4 shows how the pet toy 10 is generally elliptical shaped when viewed from the front except for the rear feet 38. Apart from the rear feet 38, the pet toy is generally thickest near its center and is generally thinner near the outer perimeter. The rear feet 38, however, are approximately as wide as the widest part of the pet toy 10. The pet toy 10 is approximately one fourth or approximately one fifth as thick as its diameter. In other words, the diameter of the pet toy body 14 (e.g. circle 42) is approximately 5 times the thickness of the pet toy 10. The back view shown in FIG. 5 similarly shows how the rear feet 38 are approximately as wide as the overall pet toy 10. The top view of FIG. 6 shows how the head 18 and back 22 have a thinner outer edge along the circumference of the pet toy 10. FIG. 7 shows how the lower body 14 has a thinner outer edge along the circumference of the pet toy 10. The overall diameter of the pet toy 10 is approximately 4 times or 5 times greater than the thickness of the pet toy 10.

Figure 8:
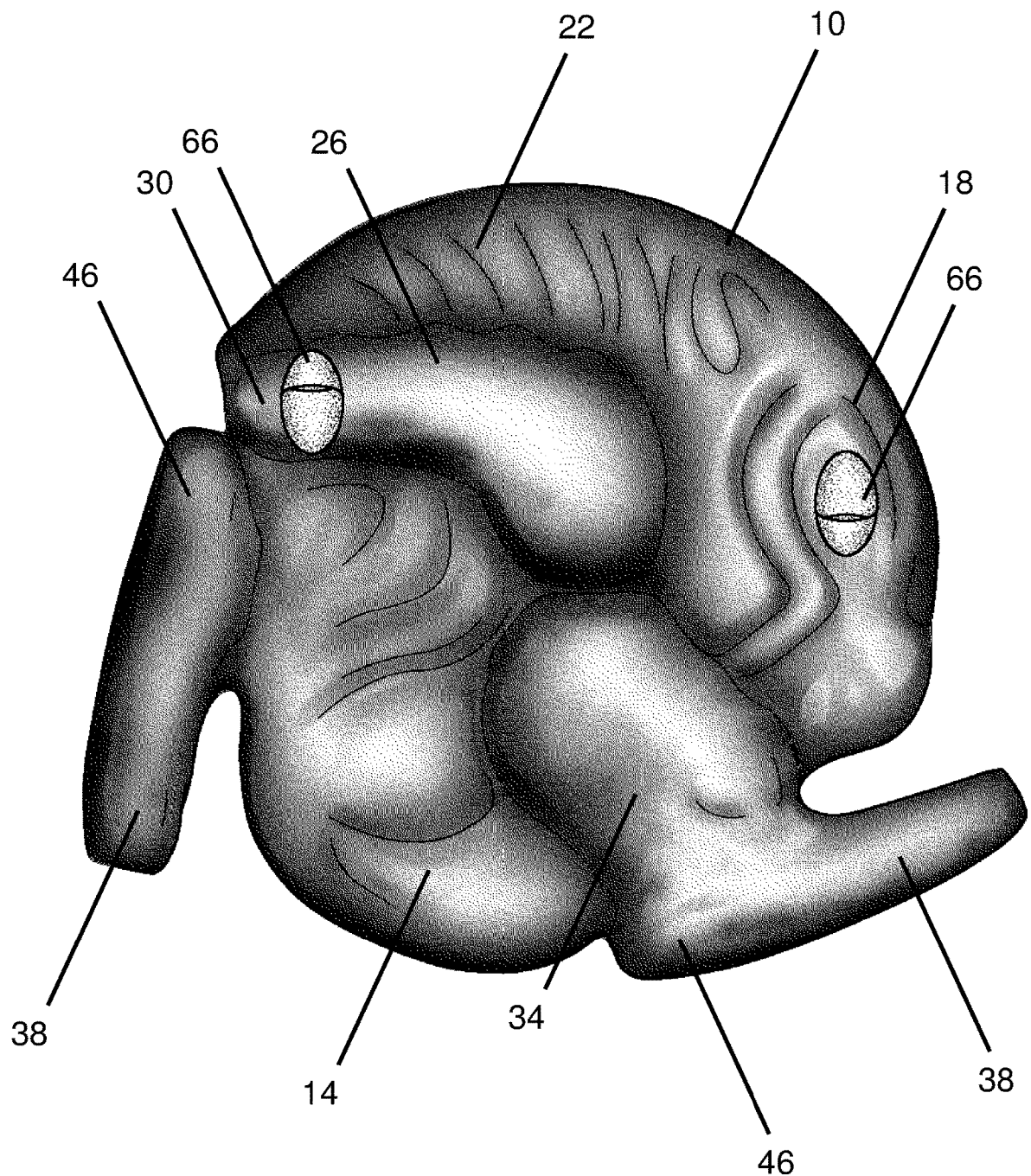
FIG. 8 is a drawing which shows another left view of the pet toy.

FIG. 8 shows another left side view of the pet toy 10. The pet toy 10 is similar to the pet toy shown in previous figures while also including whistles 66. Unless otherwise noted, the pet toy 10 shown in FIG. 8 includes all features disclosed with regards to FIGS. 1 through 7 and functions in the manner discussed. A whistle 66 has been added to the pet toy 10 in place of an eye. Another whistle 66 has been added to the pet toy 10 near a hand 30 or wrist. In one example, one or more whistles 66 may be added to the left side of the pet toy 10. If desired, one or more whistles 66 may also be added in similar locations on the right side of the pet toy 10. The whistles 66 are oriented parallel to the rounded outer perimeter of the pet toy 10, such as parallel to circle 42 in FIG. 2. This causes air to flow past the whistles while the pet toy 10 is rolling along the ground so that the whistles make noise while the pet toy 10 is rolling along the ground. The whistles 66 increase the pet's interest in the pet toy 10 and can cause the pet to remain engaged and play with the pet toy 10 for a longer period of time.

The variations in thickness of the pet toy 10 as well as the protruding legs 26, 34 and feet 38 and the various surface grooves provide an irregular exterior surface which is more appealing to pets. Pets will often remain interested in a toy and play with the toy for longer when the toy has an irregular exterior surface.

The pet toy 10 may be made from a plastic or rubber material. Whistles 66 are typically made from a harder plastic even if the body of the pet toy is made from an elastomeric material. The pet toy 10 is often made from a moderately hard and durable elastomer or rubber or a foamed rubber. An elastomer or rubber, for example, allows the pet toy 10 to bounce off of objects without causing damage to the pet toy 10 or the object. An elastomer or rubber will also allow pets to bite the pet toy 10 and carry the pet toy 10 in their mouth without damaging the pet toy or the pet's teeth. An elastomer or rubber material may also improve the action of the pet toy 10 while using the pet toy 10 by providing greater flexibility to protruding appendages such as the rear feet 38.

The pet toy 10 is particularly suited for rolling along the ground and allowing a pet to chase the pet toy 10. With the pet toy 10 oriented with the plane of the disc vertically (so that imaginary circle 42 is oriented perpendicular to the ground), the pet toy 10 can be rolled along the ground. The irregular outer perimeter of the pet toy 10 causes the pet toy to bounce and change directions and move irregularly as it rolls. When the pet toy 10 is rolled along the ground, it may roll smoothly along the head 18 and back 22 for a distance and then jump when a foot 38 contacts the ground. The pet toy 10 may roll smoothly along the lower body 14 and then jump or change directions when a rear foot 38 contacts the ground. Variations in the ground surface or vegetation may minimize these jumps/bounces or may exaggerate these bounces as the rear feet 38 encounter holes or lumps in the ground surface. The pet toy 10 may change direction when a rear foot 38 hits the ground. The result is that the pet toy 10 will roll in an irregular manner when it is rolled across the ground, and that the pet toy 10 will roll and bounce differently each time it is rolled across the ground.

The irregular motion of the pet toy 10 while it is rolling across the ground simulates a running animal. Many dogs have been bred to track or herd animals and are instinctively drawn to such an irregularly moving object. They find more enjoyment in chasing an irregularly moving object such as the pet toy 10 than in chasing a regular object such as a ball. The irregularly moving pet toy 10 is more interesting to the pet and catching the pet toy 10 provides a greater challenge for the pet. Pets tend to remain engaged with the pet toy 10 for a longer period of time because the activity is more varied and more challenging to the pet. The pet toy provides a greater degree of physical and mental stimulation to the animal and makes the game of fetch more interesting for both the animal and the person playing with the animal. This leads to a longer play time and increased activity and promotes increased exercise and health, better behavior, and increased longevity for the animal.

The above description of illustrated examples of the present invention, including what is described in the Abstract, is not intended to be exhaustive or to be limiting to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. A rolling pet toy which simulates an animal in use comprising:
    a stylized animal comprising:
        an approximately disc shaped body comprising an animal body, an animal back, an animal belly, and an animal head, wherein the approximately disc shaped body comprises an approximate circumference disposed along a central cross section of the stylized animal, a front face, and a rear face, wherein the front face of the body is convex and extends outwardly from the approximate circumference in a first direction, and wherein the rear face of the body is convex and extends outwardly from the approximate circumference in a second direction opposite the first direction, and wherein a thickness between the front face and rear face is thin compared to a diameter of the approximately disc shaped body wherein portions of the animal body form an outer perimeter of the disc shape;

wherein the front face comprises an irregular surface with a groove and a protrusion that define a body part of the animal, and wherein the rear face comprises a second irregular surface with a second groove and a second protrusion that define a second body part of the animal;

a protruding appendage which protrudes outwardly beyond the approximate circumference of the approximately disc shaped body to form a third projection and defines a third body part of the animal;

wherein the first projection, second projection, and third projection are selected from the group consisting of an animal arm, an animal leg, an animal mouth, and an animal nose;

wherein the pet toy is sized and shaped for rolling along the ground with the approximately disc shaped body perpendicular to the ground such that an outer perimeter of the approximately disc shaped body contacts the ground to roll and such that the protruding appendage periodically contacts the ground and causes the pet toy to bounce or roll in an irregular manner.

2. The rolling pet toy of claim 1, wherein the diameter is approximately 5 times greater than the thickness.

3. The rolling pet toy of claim 1, wherein the outer perimeter defined along the central cross section by the animal back, animal belly, and animal head is generally circular.

4. The rolling pet toy of claim 1, wherein the protruding appendage extends beyond the approximate circumference by a distance which is about one fifth of the diameter.

5. The rolling pet toy of claim 1, wherein the protruding appendage is an animal leg.

6. The rolling pet toy of claim 1, wherein the pet toy includes a whistle disposed on the pet toy, and wherein the whistle is oriented circumferentially on the pet toy such that whistle makes noise due to rolling motion of the pet toy.

7. The rolling pet toy of claim 1, wherein a majority of an outer edge of the animal body is disposed along the approximate circumference.

8. The rolling pet toy of claim 1, wherein the protruding appendage extends beyond the approximate circumference by a first distance and wherein the pet toy comprises a second protruding appendage which extends beyond the approximate circumference by a second distance which is different than the first distance.

9. The rolling pet toy of claim 1, wherein a center of mass of the pet toy is not located at a geometric center of the disc shape.

10. A rolling pet toy which simulates an animal in use comprising:

an approximately disc shaped generally flat body with a cross-section on a central plane, an outer perimeter extending around the body in the central plane which defines an approximate circumference of the approximately disc shaped body, a front face extending outwardly from the central plane to a first side of the central plane, a rear face extending outwardly from the central plane to a second side of the central plane opposite the first side, and a thickness between the front face and the rear face which is thin compared to a diameter of the approximately disc shaped body which forms a generally flat disc shape with an outer perimeter;

wherein the front face comprises an irregular surface with a groove and a protrusion that define a body part of the animal, and wherein the rear face comprises an irregular surface with a second groove and a second protrusion that define another body part of the animal;

a first protruding appendage which protrudes outwardly beyond the outer perimeter of the approximately disc shaped body to form a third projection and defines a third body part of the animal; and wherein the pet toy is sized and shaped for rolling along the ground with the disc shaped body perpendicular to the ground such that the outer perimeter contacts the ground to roll and such that the first protruding appendage periodically contacts the ground and causes the pet toy to bounce or roll in an irregular manner.

11. The rolling pet toy of claim 10, wherein the first protruding appendage extends from the outer perimeter by a first distance and wherein the pet toy comprises a second protruding appendage which extends from the outer perimeter by a second distance which is different than the first distance.

12. The rolling pet toy of claim 10, further comprising a second protruding appendage, wherein the second protruding appendage protrudes outwardly beyond the outer perimeter of the approximately disc shaped body to form a fourth projection, and wherein the first protruding appendage and the second protruding appendage are spaced apart around the disc outer perimeter by an angle which is less than 180 degrees and wherein the pet toy is not rotationally symmetric.

13. The rolling pet toy of claim 10, wherein the protruding appendage extends beyond the outer perimeter by a distance which is about one fifth of a diameter of the approximately disc shaped body.

14. A method of operating a rolling pet toy which simulates an animal in use comprising:

selecting a rolling pet toy comprising:

a stylized animal comprising an animal body, and an animal head;

wherein the animal forms an approximate disc shape, wherein the animal comprises across-section on a central plane, and wherein portions of the animal body form an outer perimeter of the approximate disc shape which is disposed on the central plane and which defines an approximate circumference of the approximate disc shape, with a generally circular edge and wherein the animal comprises a front face extending outwardly from the central plane to a first side of the central plane, a rear face extending outwardly from the central plane to a second side of the central plane opposite the first side, and a thickness between the front face and the rear face which is thin compared to a diameter of the approximate disc shape;

wherein the front face comprises an irregular surface with a groove and a protrusion that define a body part of the animal, and wherein the rear face comprises a second irregular surface with a second groove and a second protrusion that define a second body part of the animal;

wherein the animal comprises a first protruding appendage, wherein the first protruding appendage protrudes outwardly beyond the outer perimeter of the disc to form a third projection and defines a third body part of the animal; and rolling the pet toy along the ground with the disc shaped body generally perpendicular to the ground such that the outer perimeter contacts the ground to roll along the ground and such that the first protruding appendage periodically contacts the ground and causes the pet toy to bounce or roll in an irregular manner.

15. The rolling pet toy of claim 14, wherein the first protruding appendage is selected from the group consisting of an animal limb, an animal mouth, and an animal nose.

16. The rolling pet toy of claim 14, further comprising a second protruding appendage which is defines a fourth body part of the animal, wherein the second protruding appendage protrudes outwardly beyond the outer perimeter of the approximately disc shaped body to form a fourth projection, and wherein the first protruding appendage and the second protruding appendage are spaced apart around the outer perimeter by an angle which is approximately 120 degrees.

17. The rolling pet toy of claim 14, wherein the diameter is approximately 5 times greater than the thickness.

\* \* \* \* \*